United States Patent
Wang et al.

(10) Patent No.: US 9,462,076 B2
(45) Date of Patent: Oct. 4, 2016

(54) INFORMATION DISSEMINATION SYSTEM BASED ON INTEGRATION OF BROADCAST NETWORK AND INTERNET

(71) Applicant: CHINA RADIO INTERNATIONAL, Beijing (CN)

(72) Inventors: Lian Wang, Beijing (CN); Xiaoyan Ren, Beijing (CN); Zizhong Zhao, Beijing (CN); Yulin Chen, Beijing (CN); Wei Xin, Beijing (CN); Min Wu, Beijing (CN); Yuhan Zhu, Beijing (CN); Xin Wang, Beijing (CN)

(73) Assignee: CHINA RADIO INTERNATIONAL (CN)

( * ) Notice: Subject to any disclaimer, the term of this patent is extended or adjusted under 35 U.S.C. 154(b) by 0 days.

(21) Appl. No.: 14/403,451

(22) PCT Filed: May 24, 2013

(86) PCT No.: PCT/CN2013/076206
§ 371 (c)(1),
(2) Date: Nov. 24, 2014

(87) PCT Pub. No.: WO2013/174301
PCT Pub. Date: Nov. 28, 2013

(65) Prior Publication Data
US 2015/0134731 A1    May 14, 2015

(30) Foreign Application Priority Data
May 25, 2012 (CN) .......................... 2012 1 0167192

(51) Int. Cl.
*G06F 15/16* (2006.01)
*H04L 29/08* (2006.01)
(Continued)

(52) U.S. Cl.
CPC ....... *H04L 67/2852* (2013.01); *H04L 12/6418* (2013.01); *H04L 43/0876* (2013.01);
(Continued)

(58) Field of Classification Search
CPC .................. H04N 24/23106; H04N 24/47202

USPC ......................................................... 709/203
See application file for complete search history.

(56) References Cited

U.S. PATENT DOCUMENTS 7,302,465 B2 * 11/2007 Ayres ...................... H04L 29/06
                                                        709/203
8,255,961 B2 *  8/2012 Ellis ........................ G06F 3/0481
                                                        709/219
(Continued)

FOREIGN PATENT DOCUMENTS

CN        101201801 A        6/2008
CN        101110760 A        9/2010
(Continued)

OTHER PUBLICATIONS

International Search Report for PCT/CN2013/076206 dated Aug. 29, 2013.

*Primary Examiner* — Imad Hussain
(74) *Attorney, Agent, or Firm* — Troutman Sanders LLP

(57) ABSTRACT

The present invention provides an information dissemination system based on the integration of the broadcast network and the Internet, including: a terminal storage module, a regional storage module, a statistics-and-analysis module, a recommendation-and-analysis module, a media content management module and a network scheduling module. By two-level storing and playing of media contents, along with the statistics and analysis for on-demand behaviors of users, the intervention of the operator, and the recommendation and analysis performed by the recommendation-and-analysis module, the media contents are classified. Further, according to the classification, a media content is transmitted to the terminal storage module via the Internet; or, is transmitted to the terminal storage module via the Internet and pushed to the terminal storage module via the broadcast network; or, is pushed to the terminal storage module or the regional storage module at a predetermined time via the broadcast network. Thus, the respective advantages of the broadcast network and the Internet can be integrated and also the bandwidth pressure and the pressure of concurrent accesses on the Internet can be alleviated.

9 Claims, 1 Drawing Sheet

(51) Int. Cl.

| | | |
|---|---|---|
| *H04N 21/231* | (2011.01) | |
| *H04N 21/472* | (2011.01) | |
| *H04N 21/25* | (2011.01) | |
| *H04N 21/2665* | (2011.01) | |
| *H04N 21/2668* | (2011.01) | |
| *H04N 21/442* | (2011.01) | |
| *H04N 21/466* | (2011.01) | |
| *H04N 21/658* | (2011.01) | |
| *H04L 12/64* | (2006.01) | |
| *H04L 12/26* | (2006.01) | |
| *H04L 29/06* | (2006.01) | |

(52) U.S. Cl.
CPC ............... *H04L67/10* (2013.01); *H04L 67/42* (2013.01); *H04N 21/23106* (2013.01); *H04N 21/251* (2013.01); *H04N 21/2665* (2013.01); *H04N 21/2668* (2013.01); *H04N 21/44222* (2013.01); *H04N 21/4668* (2013.01); *H04N 21/47202* (2013.01); *H04N 21/6582* (2013.01)

(56) References Cited

U.S. PATENT DOCUMENTS

| | | | | |
|---|---|---|---|---|
| 9,037,700 | B2* | 5/2015 | Agrawal | G06Q 50/01 709/203 |
| 2009/0063681 | A1* | 3/2009 | Ramakrishnan | H04N 7/17318 709/225 |
| 2010/0058405 | A1* | 3/2010 | Ramakrishnan | H04N 7/17318 725/97 |
| 2013/0081072 | A1* | 3/2013 | Alward | H04L 12/189 725/14 |
| 2013/0117349 | A1* | 5/2013 | Burnette | G06Q 30/0201 709/202 |
| 2014/0245364 | A1* | 8/2014 | Ramakrishnan | H04N 7/17318 725/97 |

FOREIGN PATENT DOCUMENTS

| | | |
|---|---|---|
| CN | 201590869 U | 9/2010 |
| CN | 102036100 A | 4/2011 |
| CN | 102724179 A | 10/2012 |

\* cited by examiner

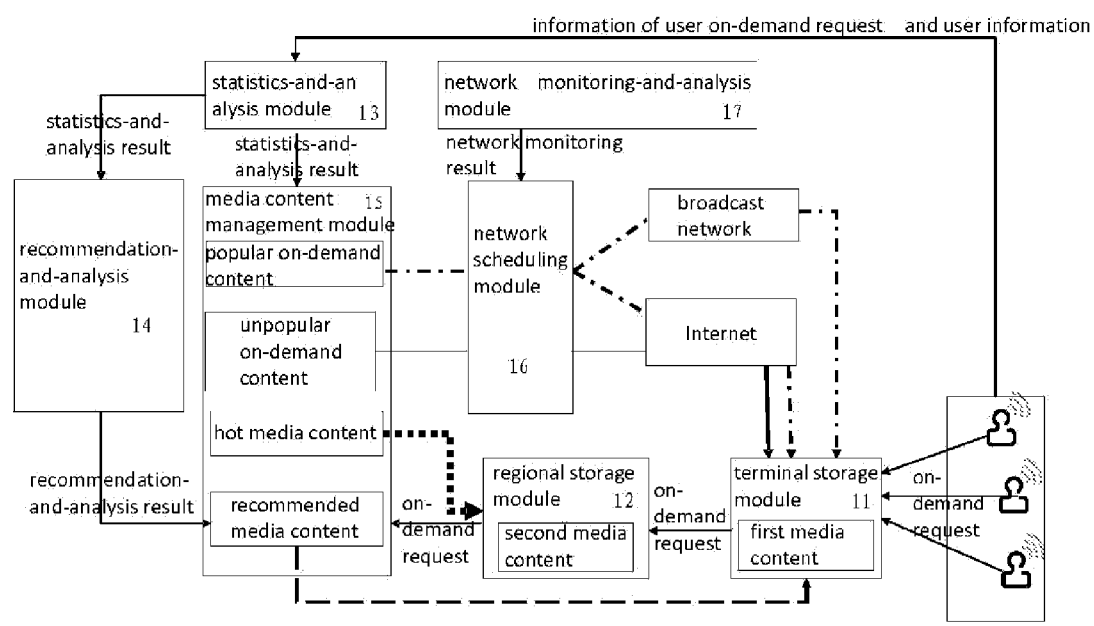

INFORMATION DISSEMINATION SYSTEM BASED ON INTEGRATION OF BROADCAST NETWORK AND INTERNET

TECHNICAL FIELD

The present invention relates to an information dissemination system, in particular, to an information dissemination system based on the integration of the broadcast network and the Internet.

BACKGROUND OF THE INVENTION

Existing dissemination of media contents is mostly implemented by push via the broadcast network or by direct access to the Internet. In addition to the function of broadcast and multicast, the broadcast network can also implement the function of pushing media contents. The combination of broadcast network and storage technology enables the broadcast network have the interaction characteristics, the broadcast network can push the mainstream media contents, such as 10 percent of the media contents in the Internet accessed by 90 percent of the Internet users, to the local storage pre-stored in the user household, and the user operates the locally stored contents in a near distance, thereby relieving the concurrent connection pressure of the Internet to some extent at the same time of realizing the interaction operations. However, if a large amount of users concurrently demand the media content un-stored in the local storage, accessing the Internet in a common used method is still required, causing significant insufficient Internet bandwidth and degrading user experiences.

SUMMARY OF THE INVENTION

In order to solve one of the above-mentioned problems in the existing information dissemination system, the present invention provides an information dissemination system based on the integration of the broadcast network and the Internet, comprising:

a terminal storage module 11, configured to store a first media content, receive a user on-demand request, and, when a user demands a media content being in said first media content, play the on-demand media content of the user; and, when a user demands a media content not being in said first media content, transmit the user on-demand request to a regional storage module 12; and said terminal storage module 11 also configured to receive and play the popular media content transmitted by the Internet, and switch the Internet-content-playing mode to the local-content-playing mode when the terminal storage module 11 receives said popular media content pushed by the broadcast network;

the regional storage module 12, configured to store a second media content and receive the user on-demand request, and, when the user demands a media content being in said second media content, play the on-demand media content of the user; and, when the user demands a media content not being in said second media content, transmit the user on-demand request to a media content management module 15;

a statistics-and-analysis module 13, configured to perform statistics and analysis on the information of the user on-demand request and the user information to obtain a statistics-and-analysis result;

a recommendation-and-analysis module 14, configured to receive said statistics-and-analysis result and perform recommendation and analysis according to said statistics-and-analysis result to obtain a recommendation-and-analysis result for marking out the recommended media content in the media content management module 15;

the media content management module 15, configured to store media contents, receive said statistics-and-analysis result, and classify the stored media contents into the popular on-demand content and the unpopular on-demand content according to said statistics-and-analysis result; and mark out the hot media content according to the recommendation information provided by the operator, and push said hot media content to the regional storage module 12 via the broadcast network; and receive said recommendation-and-analysis result, mark out, according to said recommendation-and-analysis result, the recommended media content, and push said recommended media content to the terminal storage module 11 via the broadcast network;

a network scheduling module 16, configured to, when the on-demand media content of the user is the unpopular on-demand content, transmit said on-demand content to the terminal storage module 11 via the Internet, and when the on-demand media content of the user is the popular on-demand content, transmit said on-demand content to the terminal storage module 11 via the Internet and push said on-demand content to the terminal storage module 11 via the broadcast network.

Preferably, the system of the invention further includes a network monitoring and analysis module 17, configured to monitor and analyze network parameters of the Internet to obtain a monitoring-and-analysis result and transmit said monitoring-and-analysis result to the network scheduling module 16.

The information dissemination system based on the integration of the broadcast network and the Internet provided by the present invention, by means of two-level storing and playing of media contents, along with the statistics and analysis for on-demand behaviors of users, the intervention of the operator, and the recommendation and analysis performed by the recommendation-and-analysis module 14, classifies the media contents. And, according to the classification, the system may transmit a media content to the terminal storage module 11 via the Internet; or, transmit the media content to the terminal storage module 11 via the Internet and push it to the terminal storage module 11 via the broadcast network; or, push the media content to the terminal storage module 11 or the regional storage module 12 at a predetermined time via the broadcast network. Thus, not only can the respective advantages of the broadcast network and the Internet be integrated, but the bandwidth pressure and the pressure of concurrent accesses on the Internet can be alleviated.

BRIEF DESCRIPTION OF THE DRAWINGS

The above and/or additional aspects and advantages of the present invention will become apparent and be easily understood from the following description of the embodiments in conjunction with the accompanying drawing, wherein:

FIG. 1 is a schematic block diagram to illustrate the information dissemination system based on the integration of the broadcast network and the Internet according to the invention.

DETAILED DESCRIPTION OF THE EMBODIMENTS

In the following, the embodiments of the present invention are described in detail. Examples of said embodiments are illustrated in the drawing, wherein same or similar references generally represent same or similar elements or the elements with same or similar functions throughout. The following embodiments described with reference to the drawing are exemplary and should be only used to illustrate the present invention, but should not be interpreted as the limitation to the present invention.

The present invention provides an information dissemination system based on the integration of the broadcast network and the Internet. In the present invention, the dissemination of media contents is implemented by means of integrating the Internet and the broadcast network. That is, media contents may be transmitted via the Internet and be pushed via the broadcast network. The "broadcast network" in the disclosure is a one-point to multi-points unidirectional transmission network. Referring to FIG. 1, the information dissemination system of the present invention includes a terminal storage module 11. The terminal storage module 11 is configured to store a first media content, receive a user on-demand request, and play the on-demand media content when a user demands a media content being in the first media content; and transmit the user on-demand request to a regional storage module 12 when a user demands a media content not being in the first media content. The terminal storage module 11 is also configured to receive and play the popular media content transmitted by the Internet, and switch the Internet-content-playing mode to the local-content-playing mode when the terminal storage module 11 receives the popular media content pushed via the broadcast network. The regional storage module 12 is configured to store a second media content and receive the user on-demand request, and play the on-demand media content when a user demands a media content being in the second media content; and transmit the user on-demand request to a media content management module 15 when the user demands a media content not being in the second media content. A statistics-and-analysis module 13 of the information dissemination system is configured to perform statistics and analysis on the information of the user on-demand request and the user information to obtain a statistics-and-analysis result. A recommendation-and-analysis module 14 of the information dissemination system is configured to receive the statistics-and-analysis result, and to perform the recommendation analysis according to the statistics-and-analysis result in order to obtain a recommendation-and-analysis result for marking out the recommended media content in the media content management module 15. The media content management module 15 is configured to store media contents, receive the statistics-and-analysis result, and classify the stored media contents into the popular on-demand content and the unpopular on-demand content according to the statistics-and-analysis result; and mark out the hot media content according to the recommendation information provided by the operator, and push the hot media content to the regional storage module 12 via the broadcast network; and receive the recommendation-and-analysis result, mark out the recommended media content according to the recommendation-and-analysis result, and push the recommended media content to the terminal storage module 11 via the broadcast network. A network scheduling module 16 is configured to, when the on-demand media content of a user is the unpopular on-demand content, transmit said on-demand media content to the terminal storage module 11 via the Internet; and when the on-demand media content of a user is the popular on-demand content, firstly transmit said on-demand content to the terminal storage module 11 via the Internet, and then push said on-demand media content from the pushing point to the terminal storage module 11 via the broadcast network, and if the terminal storage module 11 has received the popular on-demand media content pushed via the broadcast network, it will no longer receive this popular on-demand media content transmitted by the Internet.

In an embodiment, the terminal storage module 11 switches to the local-content-playing mode when receiving the popular on-demand content pushed via the broadcast network. In this way, the bandwidth of the Internet is no longer being occupied, and the pressure of the Internet bandwidth thereby may be alleviated.

Preferably, the terminal storage module 11 includes a receiving mechanism for receiving or stopping receiving the first media content and the popular on-demand content pushed by the broadcast network according to a user instruction. That is, for the media content pushed by the broadcast network, the terminal storage module 11 can select to receive or not to receive the media content according to user requirement. If the user expects to receive a particular media content pushed by the broadcast network, a receiving instruction from the user may be transmitted to the terminal storage module 11, and then the terminal storage module 11 may receive the media content pushed by the broadcast network; if the user expects not to receive a particular media content pushed by the broadcast network, an instruction for stopping the receiving may be transmitted to the terminal storage module 11 and the terminal storage module 11 would not receive this media content pushed by the broadcast network.

Preferably, the system of the present invention further includes a network monitoring-and-analysis module 17. The network monitoring-and-analysis module 17 is configured to monitor and analyze the network parameters of the Internet to obtain a monitoring-and-analysis result and transmit the monitoring-and-analysis result to the network scheduling module 16 to use as the basis of network scheduling. The network parameters include the network traffic, the network jitter ratio, the network time delay ratio and the network packet loss ratio, and so on.

According to a preferred embodiment, when a user demands a particular media content, performing a searching on the first media content in the terminal storage module 11 is executed at first. The terminal storage module 11 may be a personal computer, a Set Top Box, or the like. If the on-demand media content of the user has been stored in the terminal storage module 11, it may be played by the terminal storage module 11; if the on-demand media content of the user has not been stored in the terminal storage module 11, an on-demand request is transmitted by the terminal storage module 11 to the regional storage module 12 via the network. If the on-demand media content of the user has been stored in the second media content of the regional storage module 12, it may be played by the regional storage module 12 or be transmitted to the terminal storage module 11 to be played. The regional storage module 12 may be an edge storage server or the like. If the on-demand media content of the user has not been stored in the second media content, an on-demand request is transmitted by the regional storage module 12 to the media content management module 15 via the network. In embodiments of the invention, the first media content includes the recommended media content pushed by the media content management module 15 at a predetermined time via the broadcast network, the personalized media content obtained by the system performing analysis according to user characteristics, the popular on-demand content, the hot media content, and so on. The second media content includes the hot media content and the regional hot media content pushed by the media content management module 15 at a predetermined time via the broadcast network, such as the universal hot media content and the hot media content with regional characteristics, and so on. The predetermined time may include updating once a day, for example. The hot media content in the terminal storage module 11 may be a subset of the hot media content in the regional storage module 12, which belongs to the hottest media content.

The terminal storage module 11 may connect to the regional storage module 12 via a network or a dedicated line, either of which is relatively close to the user, and the on-demand media content may be accessed with only "several hops", therefore, compared with the ordinary ways of accessing the Internet, the bandwidth pressure of the Internet can be better alleviated.

The statistics-and-analysis module 13 may include a statistics-and-analysis model used for performing the modeled statistics and analysis on the information of the user on-demand request and the user information, which involves implementing statistics and analysis on the user information including the user's personal information, the user's on-demand histories, and so on, and implementing statistics and analysis on the information of the user on-demand request including the user's on-demand time, the user's IP address, the user device information and the user registration information, and so on. The user's personal information may include gender, age, educational background, home address, etc.

Further, the statistics-and-analysis module 13 is also configured to receive the user on-demand request in real-time, and perform statistics and analysis on the play positions of the same media content demanded by large amount of users to obtain the pushing point of the media content. The pushing point of the media content, i.e., the pushing position of the media content, that is, from which position this media content starts to be pushed, is obtained by performing statistics and analysis on the play positions of the same media content demanded by large amount of users. As the pushing channel bandwidth is larger than the ordinary broadcast channel bandwidth and the media content is pushed from the pushing point, the on-demand media content of the user may be rapidly pushed to the terminal storage module 11 and the media content may be pushed to the most users in the shortest time.

The recommendation-and-analysis module 14 may include a recommendation-and-analysis model used for further performing the modeling analysis according to the received statistics-and-analysis result to obtain a more personalized recommendation-and-analysis result, so that a recommendation-and-analysis result for marking out the recommended media content in the media content management module 15 may be obtained.

The media content management module 15 may include a database comprising the media contents and classifying the media contents. In the media content management module 15, the media content management module 15 classifies the media contents into the popular on-demand content and the unpopular on-demand content according to the received statistics-and-analysis result. In embodiments of the invention, the popular on-demand content is the media content whose on-demand rate reaches to a predefined threshold within the specified time period, and the unpopular on-demand content is the media content whose on-demand rate is less than the predefined threshold within the specified time period, and the hot media content is the content selected according to the strategies of the content integration, the resource classification and grading set by the operator, such as the media content that the operator wants the user to watch for the purpose of advertising. The media content management module 15 may mark out the recommended media content from the stored media contents according to the received the recommendation-and-analysis result, and the recommended media content may be a more personalized media content, such as, the media content in which that the user may be interested being reckoned by analyzing the on-demand contents of users. For example, if the user demands one episode of a TV series having a relatively high on-demand ratio, the system will recommend the next episode of the TV series or other TV series similar to the type of the TV series. According to the recommendation information provided by the operator, such as the content integration manner, the content classification or grading manner designated by the operator, the media content management module 15 classifies the media content into the hot media content that the operator wants the user to watch.

The information dissemination system based on the integration of the broadcast network and the Internet provided by the present invention, by means of two-level storing and playing of media contents, along with the statistics and analysis for on-demand behaviors of the users, the intervention of the operator, and the recommendation and analysis performed by the recommendation-and-analysis module, classifies the media contents. According to the classification, the system may perform the following operation: transmitting a media content to the terminal storage module 11 via the Internet; or, transmitting the media content to the terminal storage module 11 via the Internet and pushes it to the terminal storage module 11 via the broadcast network; or, pushing the media content to the terminal storage module 11 or the regional storage module 12 at a predetermined time via the broadcast network. Thus, not only can the respective advantages of the broadcast network and the Internet be integrated, but the bandwidth pressure and the pressure of concurrent accesses on the Internet can be alleviated.

The above description is only the preferable embodiments of the present invention, and it should be noted that for an ordinary person skilled in the art, some modifications and embellishments can also be made without departing from the principle of the present invention, and these modifications and embellishments should also be regarded as falling into the protective scope of the present invention.

The invention claimed is:

1. An information dissemination system based on the integration of the broadcast network and the Internet, characterized in that it comprises:
   a first system including:
   a first non-transitory computer-readable storage medium configured to store first media contents, and
   a first processor configured to:
   receive a user on-demand request, and,
   when a user demands a media content being in said first media contents, play the on-demand media content; and
   when a user demands a media content not being in said first media contents, transmit the user on-demand request to a second system,
   receive and play a popular on-demand media content transmitted via the Internet, and
   switch a play mode from Internet-content-playing mode to local-content-playing mode when receiving the popular on-demand media content pushed via the broadcast network;

a second system including:
  a second non-transitory computer-readable storage medium configured to store second media contents, and
  a second processor configured to:
    receive the user on-demand request, and,
    when the user demands a media content being in said second media contents, play the on-demand media content; and,
    when the user demands a media content not being in said second media contents, transmit the user on-demand request to the third system;
a third system including:
  a third non-transitory computer-readable storage medium configured to store media contents, and
  a third processor configured to:
    perform statistics and analysis on the information of the user on-demand request and the user information to obtain a statistics-and-analysis result;
    obtain, according to said statistics-and-analysis result, a recommendation-and-analysis result for marking recommended media contents;
    classify the stored media contents into popular and unpopular on-demand media contents according to said statistics-and-analysis result; and
    mark the hot media contents according to the recommendation information provided by service providers, and push said hot media contents to the second system via the broadcast network; and
    receive said recommendation-and-analysis result, mark said recommended media contents according to said recommendation-and-analysis result, and push said recommended media contents to the first system via the broadcast network;
    when the on-demand media content of the user is unpopular, transmit said on-demand media content to the first system via the Internet, and,
    when the on-demand media content of the user is popular, transmit said on-demand content to the first system via the Internet and push the on-demand media content to the first system via the broadcast network,
wherein when a user demands a media content not being in the first media contents, the first processor transmits the user on-demand request to the second system; and
wherein when the user demands a media content not being in the second media contents, the second processor transmits the user on-demand request to the third system;
wherein the on-demand media content is popular when its on-demand rate reaches to a predefined threshold within a predetermined time period, and the on-demand media content is unpopular when its on-demand rate is less than the predefined threshold within the predetermined time period.

2. The system according to claim 1, characterized in that the third system is configured to monitor and analyze network parameters of the Internet to obtain a monitoring-and-analysis result.

3. The system according to claim 1, characterized in that the first system is configured to receive or stop receiving said first media contents and said popular on-demand media contents pushed by the broadcast network according to a user instruction.

4. The system according to claim 2, characterized in that said network parameters include the network traffic, the network jitter ratio, the network time delay ratio and the network packet loss ratio.

5. The system according to claim 1, characterized in that said user information includes the user's personal information, the user's on-demand histories, and said information of the user on-demand request includes the user's on-demand time, the user's IP address, the user device information and the user registration information.

6. The system according to claim 1, characterized in that, when the first system has received the popular on-demand media contents pushed by the broadcast network, the first system will no longer receive said popular on-demand media contents transmitted via the Internet.

7. The system according to claim 1, characterized in that the third system is further configured to perform statistics and analysis on the play positions of one media content demanded by large amount of users to obtain the pushing point of said media content.

8. The system according to claim 1, characterized in that the third system is further configured to receive the user on-demand request in real-time.

9. The system according to claim 1, characterized in that the third system pushes the hot media contents and the recommended media contents to the second system and the first system respectively at a predetermined time via the broadcast network.

* * * * *